J. B. GATHRIGHT.
Riding-Saddles.
No. 204,892.    Patented June 18, 1878.
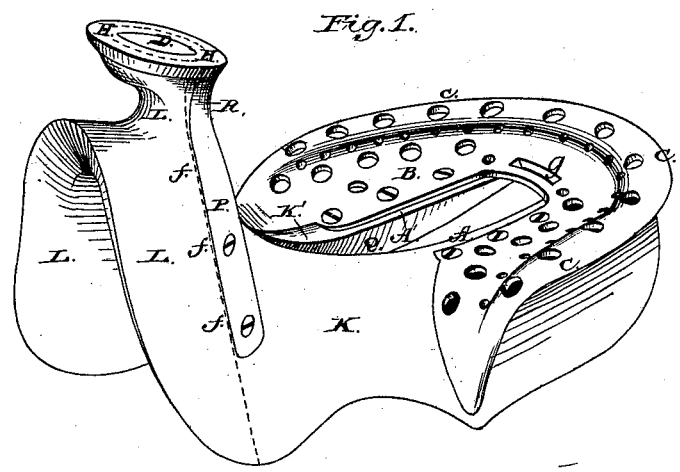
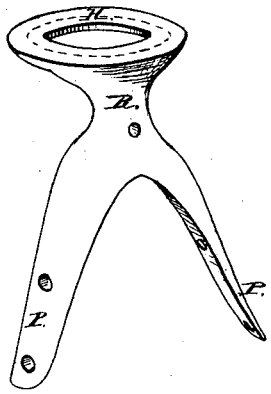

UNITED STATES PATENT OFFICE.

JOSIAH B. GATHRIGHT, OF LOUISVILLE, KENTUCKY.

IMPROVEMENT IN RIDING-SADDLES.

Specification forming part of Letters Patent No. 204,892, dated June 18, 1878; application filed April 17, 1878.

*To all whom it may concern:*

Be it known that I, JOSIAH B. GATHRIGHT, of the city of Louisville, county of Jefferson, State of Kentucky, have invented new and useful Improvements in Trees for Riding-Saddles, of which the following is a correct specification, reference being had to the accompanying drawings, which form a part of this specification.

The object of my invention is to construct saddle-trees of more perfect and uniform shape and of greater strength than as heretofore made.

The first part of my invention relates to the pomel and fork of the tree, and is particularly designed for Texas or Mexican styles of trees, which have broad horns. I construct the wooden fork and neck L L, Figure 1, in the usual way, except that the rear portions of neck and fork (one and a half inch, more or less,) are cut away, as indicated by the perpendicular dotted lines $fff$, Fig. 1. This portion of the fork and neck, together with the outer rim of the head, are supplied by the metallic casting, Fig. 2. It will be seen that the casting has the shape and finish desired for the rear part of fork and neck, and comprises also a metallic skeleton head. The skeleton iron head H has a circular recess in its under surface, in which is fitted a wooden supplement completing the head, as indicated by the dotted lines in Figs. 1 and 2. This wooden part of the head fits upon and is secured to the wooden part of the neck, and thus serves to fill out the form of the complete head, brace it, and afford a material to tack to in covering and trimming. The branches P P of the casting extend down, embracing the bars of the tree, to which they are firmly secured by bolts, screws, or rivets, and thus prevent the front of the tree from spreading or splitting. The iron head-rim also prevents the edges from chipping and splitting off, as wooden heads almost invariably do. When, now, the raw-hide covering is put on, the front of the tree has the same appearance as trees made entirely of wood, but is much stronger and more durable.

The second part of my invention relates principally to the cantle of the tree.

The bars K and K' are constructed a little different from usual to adapt them to the improved cantle, as hereinafter described.

Saddle-tree cantles have heretofore been almost universally made of wood worked into the desired shape. They are made in a variety of forms—some flat on the seat-surface, with straight points, while others have concave seat-surfaces, with points more or less rounded off downwardly. The flat style first named requires but little shaping and is not difficult to make correctly of wood; but those having deep concave seat-surfaces, with points considerably rounded down, require much extra labor as well as more material; and it is almost impossible, as heretofore made, to get them of uniform shape and size. Besides, the points so turned down, as made of wood, are across the grain, and so easily split off that it is very difficult to keep them sound. The want of uniformity in trees thus made compels the saddler to fit the "stock" to each tree separately, whereas if uniform in shape and size all the fitting for any number of saddles could be done from one pattern, thus saving greatly in labor and expense.

To obviate these difficulties, and at same time to make an extra strong tree, I have devised the cast-metal cantle B. It is peculiarly adapted to the deep concave seat with rounded points, which, while most desirable, are most difficult to obtain from wood.

By my invention we have only to expend the time and labor necessary to make the pattern of a perfect seat, and we can then reproduce them in any desired numbers, having this perfect shape uniform and strong.

It will be seen that the rear portions A A' of the seat curves of the bars are made flat in their transverse direction, and the inner edges of the cantle down to the turning-points are so shaped as to conform to and rest upon these, while the inner edges of the turned points of the cantle extend down across the outer faces of the bars, thus embracing them and effectually preventing them from spreading apart.

It will be seen that I do not extend the seat part of the metal cantle across the open space Q between the bars, nor allow the edges to cover all of the surfaces A A' of the bars. The inner parts of surfaces A A' are left exposed, so that "straining" may be tacked on, thus covering the open space between the bars and leveling up the center of the seat.

An opening, $g$, in the cantle enables us to fasten the rear end of the straining.

The cantle may be secured upon the bars by screws, nails, or by lugs cast upon it. It is cast with numerous openings or perforations through it, which may be of any desired design, some of them intended to make the seat lighter and more airy, while others are designed to be used for stitching through, by means of which the saddler may not only secure the seat-leather to the tree, but may draw it down into perfect conformity with the shape of the cantle.

The outer edge or perimeter of the cantle is so curved as to form the roll $c$ $c$ $c$, having a convex upper and concave under surface. As it is desirable to have the metal quite thin, this roll adds largely to the strength of the cantle as well as to its finished appearance.

The invention herein described for bracing the fronts of saddle-trees is readily adapted to "muley" trees, or those without horns. In this case, as in the case of horned trees, we construct the fork with the rear portion cut away, supplying the deficiency with a casting of the same size and shape as the omitted portion, so that when the metal and wood portions are together put on the bars they form a complete fork or front. This is applicable to any style of muley tree.

Having thus described my invention, what I claim as new, and desire to secure by Letters Patent, is—

1. As a brace and supplement to the wooden front of a saddle-tree, the metallic casting herein shown and described, combining head-rim H, neck portion R, and branches P P', as constructed and combined with parts L L, substantially as and for the purpose herein shown and described.

2. A front (or fork) for muley saddle-trees, constructed mainly of wood, supplemented and completed by a cast-metal rear and top portion, substantially as herein described.

3. In a tree for riding-saddles, the cast-metal cantle B, perforated throughout the seat portion for ventilation and stitching purposes, as herein shown and described.

4. In a tree for riding-saddles, the cast-metal cantle B having the seat portion perforated for ventilation and stitching purposes, as described, in combination with the bars K and K', constructed substantially as herein shown and described.

5. In a tree for riding-saddles, the cast-metal cantle B, combining concave seat, rounded points, and concavo-convex roll, substantially as herein shown and described.

6. In a tree for riding-saddles, the metallic cantle B, provided with slot $g$, substantially as and for purpose herein shown and described.

Witness my hand this 13th day of April, 1878.

JOSIAH B. GATHRIGHT.

Witnesses:
JOHN J. HARBISON,
GEO. W. BRADEN.